United States Patent
Rothenberg

(10) Patent No.: US 6,358,055 B1
(45) Date of Patent: Mar. 19, 2002

(54) METHOD AND APPARATUS FOR TEACHING PROSODIC FEATURES OF SPEECH

(75) Inventor: Martin Rothenberg, Dewitt, NY (US)

(73) Assignee: Syracuse Language System, Syracuse, NY (US)

( * ) Notice: Subject to any disclaimer, the term of this patent is extended or adjusted under 35 U.S.C. 154(b) by 0 days.

(21) Appl. No.: 09/587,800

(22) Filed: Jun. 6, 2000

Related U.S. Application Data

(62) Division of application No. 08/448,708, filed on May 24, 1995, now Pat. No. 6,109,923.

(51) Int. Cl.[7] .............................................. G09B 19/04
(52) U.S. Cl. .................... 434/185; 434/156; 434/169; 704/200; 381/51
(58) Field of Search .................... 434/118, 156–158, 434/169, 185, 307 R, 308, 236, 365; 381/48–53, 41–43; 704/200, 206, 257, 268, 277

(56) References Cited

U.S. PATENT DOCUMENTS

| | | |
|---|---|---|
| 3,345,979 A | 10/1967 | Miura et al. |
| 3,713,228 A | 1/1973 | Mason et al. |
| 3,881,059 A | 4/1975 | Stewart |
| 4,247,995 A | 2/1981 | Heinberg |
| 4,333,152 A | 6/1982 | Best |
| 4,406,626 A | 9/1983 | Anderson et al. |
| 4,641,343 A | 2/1987 | Holland et al. |
| 4,681,548 A | 7/1987 | Lemelson |

(List continued on next page.)

FOREIGN PATENT DOCUMENTS

| | | |
|---|---|---|
| WO | WO 97/29482 | 8/1997 |
| WO | WO 98/02862 | 1/1998 |

OTHER PUBLICATIONS

International Search Report for PCT/US99/02782, mailed Jun. 10, 1999.

Written Opinon for PCT/US99/02782, mailed Jan. 12, 2000.

Hiroyuki Tsuboi, et al., A Real–Time Task–Oriented Speech Understanding System Using Keyword Spotting, IEEE Transactions on Acoustical Speech and Signal Processing, Sep. 1992, at 197–200.

Jay G. Wilpon, et al., Automatic Recognition of Keywords in Unconstrained Speech Using Hidden Markov Models, IEEE Transactions on Acoustical Speech and Signal Processing, Nov. 1990, at 1870–78.

(List continued on next page.)

*Primary Examiner*—Joe H. Cheng
(74) *Attorney, Agent, or Firm*—Fulbright & Jaworski LLP

(57) ABSTRACT

A system and apparatus for teaching prosodic features of speech senses and extracts prosodic or suprasegmental variables of a user's speech segment. Prosodic features of speech include pitch and loudness variations, as opposed to articulatory or sequential features of speech which are the primary determinants of phoneme variations. Once prosodic variables have been extracted from a speech segment, the variables are used to modulate a quasiperiodic waveform such as a sinusoid, a pulse-train, or a synthesized vowel-like waveform, or the parameters can be used to modulate a random-noise-like waveform. A modulated waveform can be played acoustically, and the user can hear the variation of the prosodic parameters without interference from the articulatory parameters of a complete waveform. This auditory feedback can be combined with visual feedback of the speech segment to teach proper prosodic speech formation. Auditory feedback for teaching prosodic features can also be formed without a modulation process by removing articulatory information from a speech segment, and non-acoustic measures sensors of prosodic feature, such as an electroglottograph, can also be employed.

10 Claims, 4 Drawing Sheets

U.S. PATENT DOCUMENTS

| | | | |
|---|---|---|---|
| 4,862,503 | A | 8/1989 | Rothenberg |
| 4,900,256 | A | 2/1990 | Dara-Abrams |
| 4,909,261 | A | 3/1990 | Rothenberg |
| 5,010,495 | A | 4/1991 | Willetts |
| 5,056,145 | A | 10/1991 | Yamamoto et al. |
| 5,061,186 | A | 10/1991 | Jost et al. |
| 5,142,657 | A | 8/1992 | Ezawa et al. |
| 5,197,883 | A | 3/1993 | Johnston |
| 5,278,943 | A | 1/1994 | Gasper et al. |
| 5,293,584 | A | 3/1994 | Brown et al. |
| 5,302,132 | A | 4/1994 | Corder |
| 5,307,442 | A | 4/1994 | Abe et al. |
| 5,315,689 | A | 5/1994 | Kanazawa et al. |
| 5,340,316 | A | 8/1994 | Javkin et al. |
| 5,357,596 | A | 10/1994 | Takebayashi et al. |
| 5,384,893 | A | 1/1995 | Hutchins |
| 5,387,104 | A | 2/1995 | Corder |
| 5,393,236 | A | 2/1995 | Blackmer et al. |
| 5,421,731 | A | 6/1995 | Walker |
| 5,487,671 | A | 1/1996 | Shpiro et al. |
| 5,503,560 | A | 4/1996 | Stentiford |
| 5,524,169 | A | 6/1996 | Cohen et al. |
| 5,536,171 | A | 7/1996 | Javkin et al. |
| 5,540,589 | A | 7/1996 | Waters |
| 5,592,585 | A | 1/1997 | Van Coile et al. |
| 5,634,086 | A | 5/1997 | Rtischev et al. |
| 5,636,325 | A | 6/1997 | Farrett |
| 5,677,992 | A | 10/1997 | Lyberg |
| 5,717,828 | A | 2/1998 | Rothenberg |
| 6,109,923 | A | 8/2000 | Rothenberg |

OTHER PUBLICATIONS

Kai–Fu Lee, Context–Dependent Phonetic Hidden Markov Models for Speaker–Independent Continuous Speech Recognition, IEEE Transactions on Acoustical Speech and Signal Processing, Apr. 1990, at 599,609.

S. Hiller, et al., SPELL: An Automated System for Computer–Aided Pronunciation Teaching, 13 Speech Communication 463–73 (1993).

P. Bamberg, et al., Phoneme–Based Training for Large–Vocabulary Recognition in Six European Languages, Proc. of the Second Eur. Conf. on Speech Comm. and Tech. (Geneva), Sep. 1991, at 175–81.

A. Rudnicky, et al., Survey of Current Speech Technology, Communications of the ACN, Mar. 1994, at 52–56.

D. B. Roe, et al., Whither Speech Recognition: The Next 25 Years, IEEE Communications Magazine, Nov. 1993, at 54–62.

R. D. Peacocke, et al., An Introduction to Speech and Speaker Recognition, Computer Magazine, Aug. 1990, at 26, 28, 29, 31, 32, 34.

Dorothy M. Chun, Teaching Tone and Intonation with Microcomputers, Calico Journal, Sep. 1989, at 21–46.

G.W.G. Spaii, et al., A Visual Display for the Teaching of Intonation to Deaf Persons: Some Preliminary Findings, 16, Journal of Microcomputer Applications at 277–286 (1993).

Manfred Schroeder, Reference Signal for Signal Quality Studies, 44, Journal of the Acoustical Society of America, at 1735–36 (1968).

Martin Rothenberg, A Multichannel Electroglottograph, 6, Journal of Voice, 36–43 (1992).

M. Rothenberg et al, Encoding Voice Fundamental Frequency into Vibrotactile Frequency, 66, J. Acoust. Soc. Am., 1029–38 (1979).

Martin Rothenberg, Measurement of Airflow in Speech, 20, Journal of Speech and Hearing Research, 155–76 (1977).

G.W.G. Spaii, et al., A Visual Display System for the Teaching of Intonation to Deaf Persons, 1991 IPO Annual Progress Report, 127–138.

METHOD AND APPARATUS FOR TEACHING PROSODIC FEATURES OF SPEECH

This application is a divisional application of application Ser. No. 08/448,708, filed May 24, 1995, now U.S. Pat. No. 6,109,923.

BACKGROUND OF THE INVENTION

1. Field of the Invention

This invention relates to a system for teaching spoken languages. More precisely, this invention relates to a system for teaching the prosodic features of a spoken language.

2. Description of the Related Technology

The information in natural spoken languages is transmitted by a combination of articulatory variations and prosodic variations (or prosody). In English and most European and middle eastern languages, the articulatory variations, often referred to as the segmental features of speech, generally determine which sounds of the language (phonemes) are being represented, and therefore also determine which words are being represented. In such languages, prosodic variables, or suprasegmental features as they are sometimes referred to, such as sound intensity (loudness), intonation (the variation of voice pitch on the perceptual level, or voice fundamental frequency on a physical level), variations in the rate of speech (usually referred to as the 'duration' variable), and voice source quality primarily determine the stress patterns in a sentence and convey emotional factors and secondarily interact with the segmental features to influence meaning. However, in the so-called tone languages such as Thai or Mandarin Chinese, the intonation pattern is also an important determinant of the word being pronounced.

If the patterns of the prosodic features in a new language differ markedly from those of a learner's previous languages, the proper control of prosodic parameters such as intonation and intensity may be difficult to learn, especially for an adult learner. Thus the accent of a foreign speaker often includes intonation and stress pattern errors that affect naturalness and sometimes understandability. In addition, there are many persons that require coaching in their native language to improve their use of prosody during speech or singing.

To aid the learner of a new language, speakers with voice or speech problems related to prosody, or deaf learners of an oral language, a number of systems have been proposed to convert prosodic variables into a feedback display that uses a sense modality other than hearing. The variables of intonation and intensity can be measured readily from either the acoustic speech waveform or, in the case of intonation, from a contact microphone on the neck, an airflow measuring mask, or a device known as an electroglottograph. Examples of such devices are described in Martin Rothenberg, *Measurement of Airflow in Speech*, 20 J. Speech and Hearing Res. 155–76 (1977); Martin Rothenberg, *A Multichannel Electroglottoaraph*, 6 J. of Voice 36–43 (1992); and U.S. Pat. Nos. 3,345,979, 4,862,503 and 4,909,261.

Although the tactile sense modality has been used for feedback, especially in speech training for profoundly deaf learners, such as Martin Rothenberg & Richard D. Molitor, *Encoding Voice Fundamental Frequency into Vibrotactile Frequency*, 66 J. of the Acoustical Soc'y of Am. 1029–38 (1979), the visual sense modality is more commonly employed. Various systems for providing visual feedback for the teaching of intonation are described by Dorothy M. Chun, *Teaching Tone and Intonation With Microcomputers*, CALICO J., Sept. 1989, at 21–46. On a visual display, the time variable is most often encoded into a spatial variable, usually horizontal distance, and the intonation or the intensity of the voice signal is encoded into a visual variable such as vertical distance, line width, image brightness or image color value. The resulting visual display is usually displayed and held on the screen using a memory function, for post-production viewing and analysis by the speaker or a teacher and for possible comparison with a model trace or display. The state-of-the-art may include scrolling of the display if the speech segment is too long for the display, and provisions for time and amplitude normalization between the speaker's trace and the model trace.

However, the transformations between the auditory sensations of pitch and loudness (the primary perceptual correlates of intonation frequency and acoustic intensity or amplitude, respectively) and visual variables representing intonation frequency and time, or amplitude and time, are not easy or natural for many learners. The visual display often highlights details that are irrelevant to auditory perception. These irrelevant details are sometimes referred to as microintonation. G. W. G. Spaai, et al., *A Visual Display for the Teaching of Intonation to Deaf Persons: Some Preliminary Findings*, 16 J. of Microcomputer Applications 277–286 (1993). In addition, a major problem in the use of such visual displays is the fact that natural speech contains many gaps in the voice stream caused by unvoiced sounds, certain occlusive consonants, and short pauses. Such microintonation and gaps in the stream of voice are readily ignored by the auditory system when judging the patterning of voice pitch or loudness in speech or singing. There have been a number of automated systems proposed for simplifying visual displays of intonation in order to circumvent these factors such as G. W. G. Spaai, et al., *A Visual Display for the Teaching of Intonation to Deaf Persons: Some Preliminary Findings*, 16 J. of Microcomputer Applications 277–286 (1993); S. Hiller, et al., *SPELL: An Automated System for Computer-Aided Pronunciation Teaching*, 13 Speech Comm. 463–73 (1993). However, a visual display constructed according to the present art remains difficult to interpret without special training.

FIG. 1 illustrates this difficulty with a trace of an intonation pattern that might be typical for the English sentence "We put the apple in." The time variable is measured on horizontal axis 50, and the intonation variable is measured on vertical axis 60.

SUMMARY OF THE INVENTION

In this system, each prosodic variable that is the subject of instruction is superimposed or modulated onto either a periodic tone waveform, or a noise-like signal, so that during a replay of this modulated tone, or noise, the user can hear the variation of the modulating variable without interference from the articulatory features of the complete voice waveform. For encoding voice intonation, or combined intonation and intensity, the effect might be similar to hearing a hummed or a single-vowel version of the original phrase or sentence. With this modulated tone or noise input, the user's auditory system can provide the user with the sensation of continuous or smooth pitch or loudness variation even in the presence of microintonation or gaps caused by unvoiced sounds, occlusive consonants, or short pauses.

Also, by replaying this modulated-sound version of the phrase or sentence simultaneously with a visual encoding of the prosodic variable, the user can learn to interpret the visual display correctly. This learning process can be helped by a slower-than-real-time playback in some cases, so that correspondence between the variation of the auditory parameter and the visual display can be followed more easily.

It is also envisioned that the visually encoded patterns of the user can be displayed in close proximity to one or more model patterns to facilitate visual comparison. Model patterns can be recorded by an instructor or pre-stored in a system memory, or generated from a system of rules that describe the proper variation of that parameter in the language being learned. A rating of the closeness of match of the user's patterns to the model patterns can also be made available.

DETAILED DESCRIPTION OF THE PREFERRED EMBODIMENTS

Figure 1:
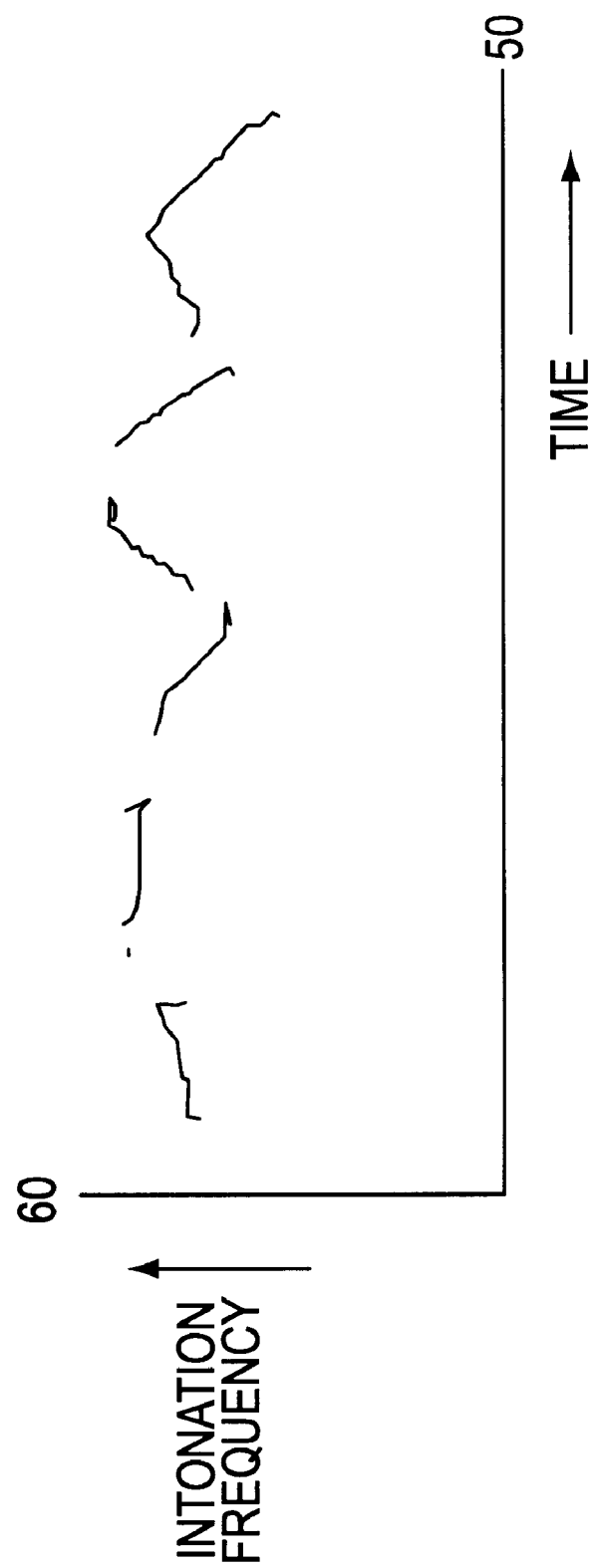
FIG. 1 shows a trace of an intonation pattern.
Figure 2:
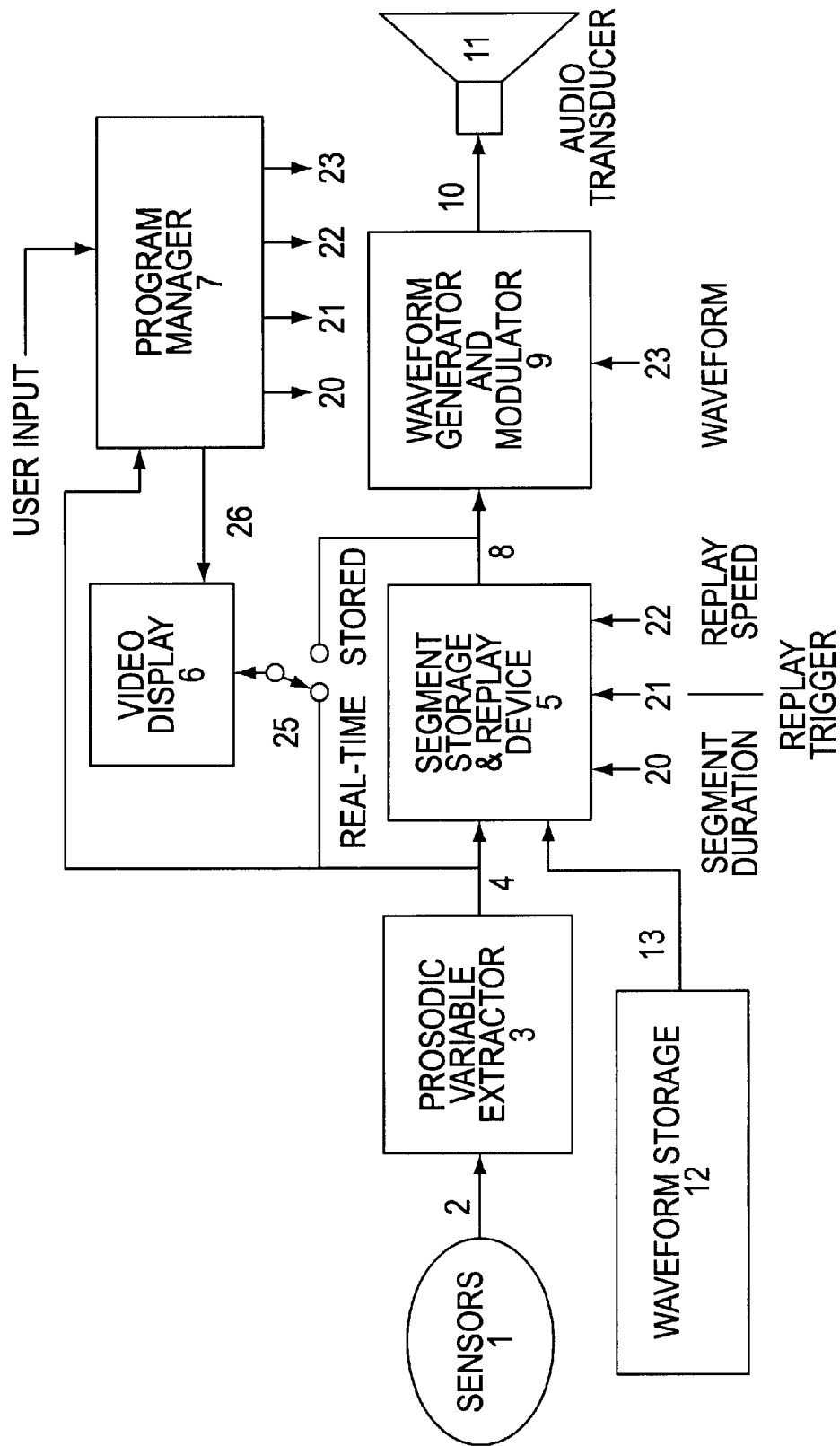
FIG. 2 shows an embodiment of an apparatus for teaching prosodic features of speech.

In the embodiment shown in FIG. 2, one or more sensors 1, such as a microphone, throat microphone, airflow mask, or electroglottograph, provides a signal 2 from which one or more prosodic variables, such as intonation frequency or sound intensity, can be extracted.

Prosodic variable extractor 3 extracts the prosodic parameters from the signal 2 and provides an output 4 which is an encoding of the time variation of the desired prosodic parameters. For the measurement of intonation frequency, prosodic variable extractor 3 can be an electronic circuit or an equivalent computer program for voice pitch-tracking that is constructed according to current art, and which can consist of a low-pass filter that effectively reduces the amplitude of harmonics above the fundamental frequency, followed by a zero-crossing detector and a mechanism for measuring the period of the time interval between successive positive-going or negative-going zero crossings, with the successive, period-by-period estimates of intonation frequency being output as the reciprocal of each successive period estimate. The logarithm of the reciprocal may alternatively be output in order to better equalize the variation range of the parameter display at low and high voice pitches. For the measurement of voice intensity, prosodic variable extractor 3 can be an electronic circuit or equivalent computer program that computes and provides as an output 4 either the peak signal amplitude, average rectified signal amplitude, or RMS signal amplitude, over a moving time window that is preferably slightly larger than the longest expected voice period. A logarithmic or other similar non-linear scaling may also be used for the intensity parameter in order to improve the appearance of the display.

The segment storage and replay device 5, which can be a segment of the digital memory of a digital- computer and a computer program for reading that segment of memory, receives the output 4 of the extractor 3, and stores the values of the variables over a finite period of time having a duration determined by an output 20 of a program manager 7. Program manager 7 can be, in part, a computer program for controlling the recording and replay functions of the segment storage and replay device 5, including the starting and stopping of the storage function, the starting and stopping of the replay function, and the speed of the replay. The program manager 7 can receive as one input the output 4 of the extractor 3 for use in determining the correct timing of the segment storage operation. The segment storage and replay device 5 can accordingly be directed by an output 21 of the program manager 7 to play a stored segment of the variables, either once or repeatedly, to provide an output 8. Additionally, the capability may be provided to store more than one segment, in order that more than one segment can be output simultaneously for viewing on the video display 6, which can be the video monitor of a computer.

For optional real-time viewing of the display (while the user is speaking), the video display 6 can receive the extractor output 4 through a switch 25, which can operate under the control of the program manager 7, with the switch 25 connecting the video display 6 to output 4 of the extractor 3 during the extraction process and to output 8 of the segment storage and replay device 5 during replay periods. The replay speed of the variables at output 8 can preferably be adjusted by an output 22 of the program manager 7, including adjustment to a speed slower than real-time. Note that this adjustment of replay speed should preferably be performed without a change in the auditory sensation produced by the audio transducer 11, which may be an amplifier and a loudspeaker or an amplifier and headphones. If intonation is the prosody parameter being taught, the effect of slowing the replay speed should be preferably one of speaking slower and not of slowing the speed of a tape recorder playback.

Output 8 of the segment storage and replay device 5 is also sent to a waveform generator and modulator 9. Waveform generator and modulator 9 can be a standard MIDI audio synthesizer, such as those commonly provided in computers conforming to the MPC standard for multimedia computers, or it can be a specially-constructed computer program that generates the required waveform. Optimally, the output of the waveform generator and modulator 9 is synchronized, through a timing signal 26 from the program manager 7, with a marker on the trace of the video display 6, such as an arrow, dot, line, or area of brightening or color change on the display, which traces for the user the instantaneous values of the visual display during a replay cycle. The waveform generator and modulator 9 generates a quasiperiodic waveform output 10, with possible waveforms including a sinusoid, a pulse-train, or a synthesized vowel-like waveform. The waveform 10 may also have a random-noise-like nature if encoding an amplitude-derived variable from output 4.

The form of the quasiperiodic waveform may be selectable from an output 23 of the program manager 7. At least one parameter of the waveform 10 is controlled or modulated in some proportion by the output 8 of the segment storage and replay device 5. When encoding a voice intonation frequency variable, the controlled or modulated parameter of output waveform 10 is preferably its frequency.

Otherwise, the output 10 of the waveform generator and modulator 9 is sent to audio transducer 11. A waveform storage 12, which may be a section of the digital memory of a computer, may also be provided for storing model waveforms representing correct pronunciation, the output 13 of which may be input to the video display 6 and displayed simultaneously with the user's waveform to facilitate a comparison of the pattern of the user's voice with the pattern of the model. Output 13 may alternatively be connected as an input to the segment storage and replay device 5 so that a simultaneous visual and auditory comparison can be made. This second configuration is shown in FIG. 2.

The program manager 7 can have a user input capability, which can be manual switches or knobs, or can be areas on the display screen of the video display 6 that can be clicked on with the use of a computer mouse, so that one or more of the system parameters that are set by the program manager 7 can be controlled through user input.

Figure 3:
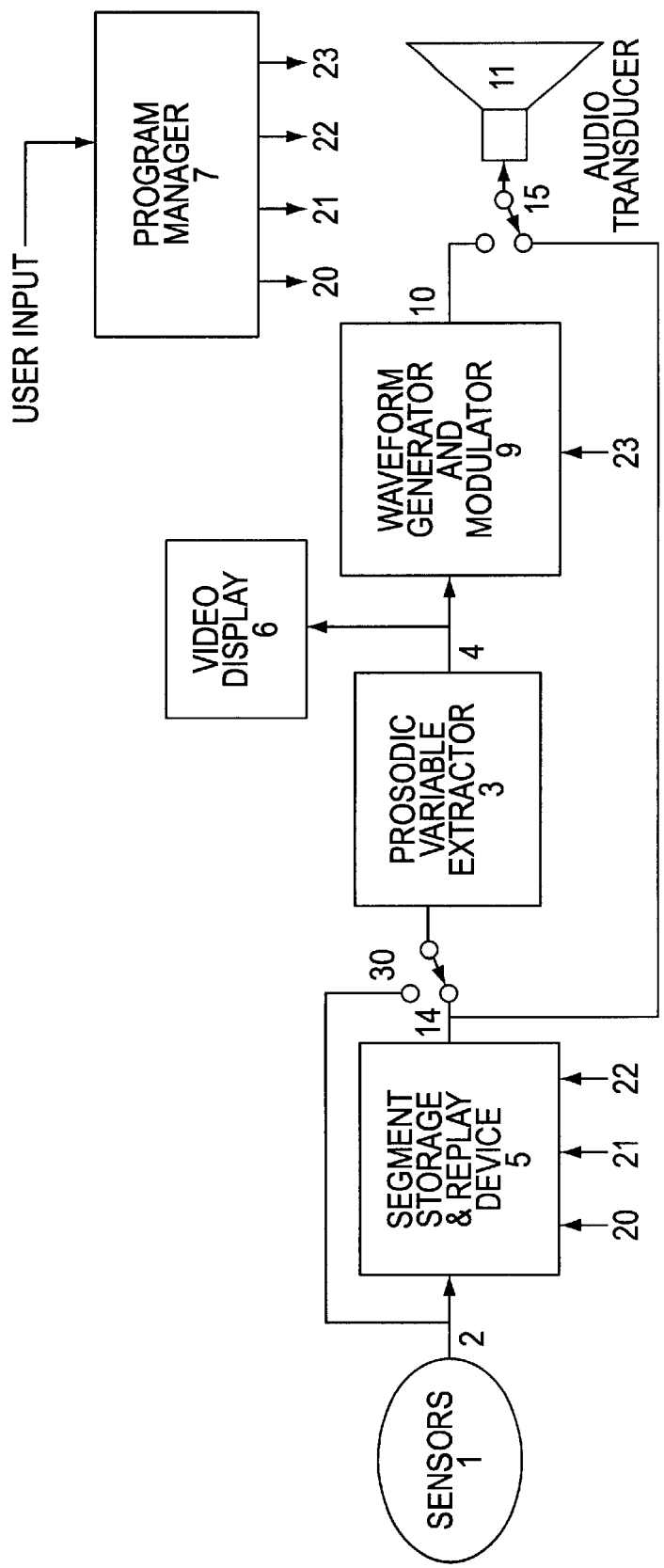
FIG. 3 shows an alternative embodiment of an apparatus for teaching prosodic features of speech.

An alternative embodiment shown in FIG. 3 is constructed in a manner similar to the embodiment of FIG. 2, except that segment storage and replay device 5 precedes the prosodic variable extractor 3, so that a waveform 14 of the original speech signal can be replayed, instead of the processed waveform 10, if so selected by switch 15. In this embodiment, the sensors 1 preferably include a microphone. For optional real-time viewing of the display using this embodiment, a real-time/stored switch 30 may be provided that directs the sensor output 2 to the input of the extractor 3 during the recording process.

Figure 4:
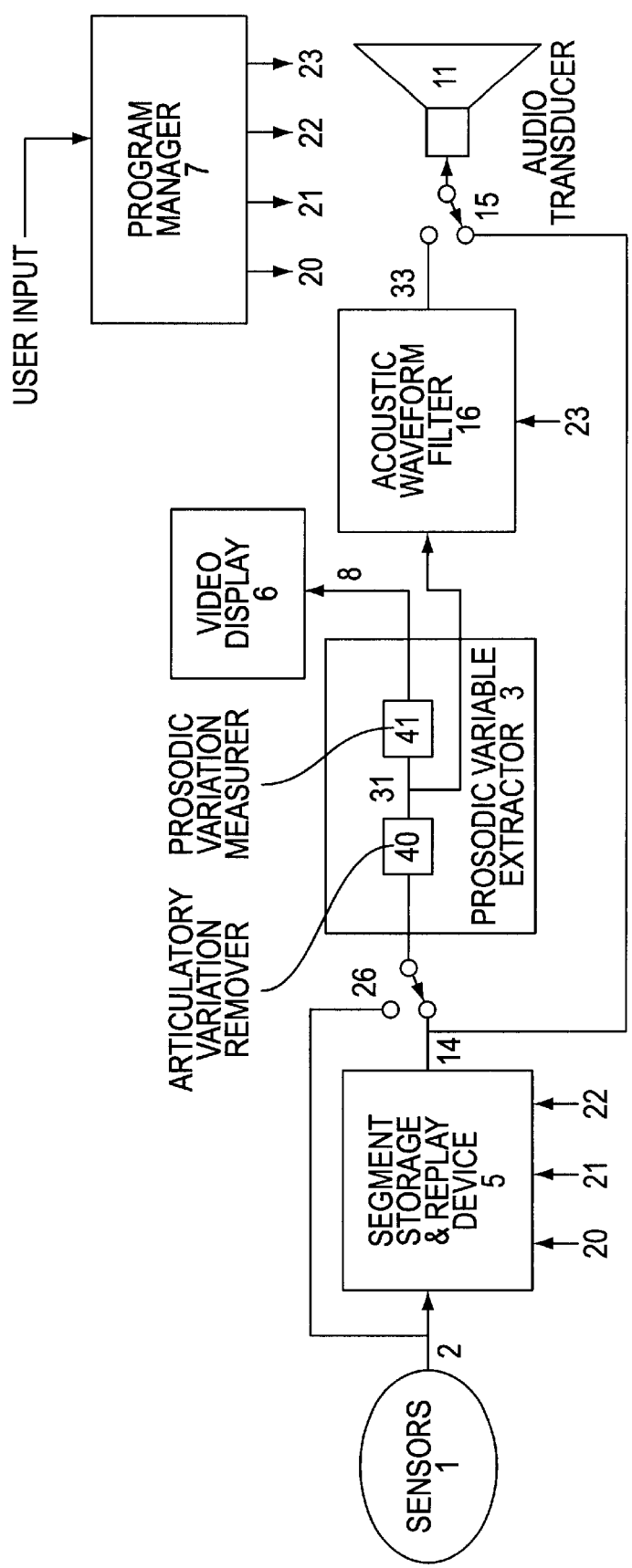
FIG. 4 shows another alternative embodiment of an apparatus for teaching prosodic features of speech.

Another alternative embodiment shown in FIG. 4 is similar to the embodiment of FIG. 3 except that the acoustic waveform is obtained from a processed version of the original sensor waveform rather than by a process of modulation. This eliminates the need for the waveform generator and modulator 9 in FIGS. 2 and 3. In this embodiment, prosodic variable extractor 3 includes an articulatory variation remover 40 that removes or attenuates any articulatory information or undesired prosodic information in the sensor output 2, while retaining the prosodic parameters to be taught. Prosodic variable measurer 41 follows the remover 40. Measurer 41 determines the values of the prosodic variables at the output 31 of the articulatory variation remover 40 and provides these measurements at an output 8, which is supplied to the video display 6.

If a sensor 1 in the embodiment of FIG. 4 is a microphone, there are a number of methods well-described in the literature for implementing the articulatory variation remover 40, including the process known as Linear Predictive Coding (LPC analysis). In the case of LPC analysis, the output 31 could be the LPC residual signal, which contains little articulatory information. Another method is inversefiltering, in which case the output 31 during voiced speech would be an approximation of the laryngeal voice source waveform. If the intonation range is not too great (less than about an octave), intonation frequency can also be preserved by a band-pass filter encompassing the lowest and highest exeected intonation frequencies, in which case the output 31 would be an approximate sinusoid at the voice intonation frequency. Each of these three methods produces a simple waveform at the voice intonation frequency which can be easily standardized in waveform and intensity before being sent to output 31.

A method for removing spectral (frequency) information from a digitized speech signal and retaining only the amplitude of the waveform is described by Manfred Schroeder, *Reference Signal for Signal Quality Studies*, 44 J. of the Acoustical Soc'y of Am. 1735–36 (1968). Using this method, each successive digitized sample of the waveform is given a randomly assigned polarity. The resulting waveform, which can be sent to output 31, would retain most of the intensity and timing information of the original waveform.

If a sensor 1 in the embodiment of FIG. 4 is an electroglottograph or a throat microphone (a vibration sensor attached to or pressing on the surface of the neck), the sensor output 2 bears little or no articulatory information, and the articulatory variation remover 40 for preserving intonation frequency can be a bandpass filter encompassing the lowest and highest expected intonation frequencies (about 50 to 300 Hz for men and 75 to 450 Hz for women), followed by a system for forming a standard pulse for each cycle.

In the embodiment of FIG. 4, waveform 31 may be sent directly to audio transducer 11 or optionally be passed through an acoustic waveform filter 16 of a standard type that optimizes the acoustic quality of the resulting tone. The waveforms so formed may include pulsatile, sinusoidal, and vowel-like waveforms. As in the embodiment of FIG. 3, a switch 15 may be included to allow the user to listen to the original stored sensor waveform 14 instead of the processed waveform 33.

In each of the above embodiments, audio transducer 11 can also be a vibrotactile or electrotactile transducer or an array of such transducers, so that this apparatus may be used by a deaf person learning the prosodic features of a spoken language. For the learning of voice intonation through vibrotaction, the intonation frequency of the learner and of a model voice is advantageously reduced to a range optimal for the tactile sense, as described by Martin Rothenberg & Richard D. Molitor, *Encoding Voice Fundamental Frequency into Vibrotactile Frequency*, 66 J. of the Acoustical Soc'y of Am. 1029–38 (1979).

This method and apparatus for teaching prosodic features of speech may, of course, be carried out in specific ways other than those set forth here without departing from the spirit and essential characteristics of the invention. Therefore, The presented embodiments should be considered in all respects as illustrative and not restrictive and all modifications falling within the meaning and equivalency range of the appended claims are intended to be embraced therein.

I claim:

1. An apparatus for teaching prosodic features of speech comprising:
   a sensor having a signal sensor output;
   a prosodic variable extractor having a signal input connected to said signal senor output of said sensor and having an output signal representing a prosodic feature of said signal sensor output;
   an audio transducer, connected to an output of the signal generator; and
   wherein the prosodic variable extractor includes an articulatory variation remover.

2. An apparatus for teaching prosodic features of speech comprising:
   a sensor having a signal sensor output;
   a segment storage and replay device having a signal input connected to said signal sensor output of said sensor and having a signal segment storage and replay output;
   a prosodic variable extractor having a signal input connected to said signal segment storage and replay output said segment storage and replay device and having an output signal representing a prosodic feature of said signal segment storage and replay device output;
   a waveform generator and modulator, connected to an output of the extractor; and
   an audio transducer, connected to an output of the waveform generator and modulator.

3. An apparatus for teaching prosodic features of speech according to claim 2, further comprising:
   a video display, connected to an output of the extractor.

4. An apparatus for teaching prosodic features of speech according to claim, 2, wherein the extractor is also connected to an output of the sensor.

5. An apparatus for teaching prosodic features of speech according to claim 2, wherein the audio transducer is also connected to an output of the segment storage and replay device.

6. An apparatus for teaching prosodic features of speech comprising:
   a sensor having a signal sensor output;
   a segment storage and replay device having a signal input connected to said signal sensor output of said sensor and having a signal segment storage and replay output;

a prosodic variable extractor having a signal input connected to said signal segment storage and replay output said segment storage and replay device and having an output signal representing a prosodic feature of said signal segment storage and replay device output;

an acoustic waveform filter, connected to an output of the extractor; and an audio transducer, connected to an output of the acoustic waveform filter.

7. An apparatus for teaching prosodic features of speech according to claim 6, wherein the extractor comprises an articulatory variation remover.

8. An apparatus for teaching prosodic features of speech according to claim 6, wherein the audio transducer is also connected to an output of the segment storage and replay device.

9. An apparatus for teaching prosodic features of speech according to claim 6, further comprising:

a video display, connected to an output of the extractor.

10. An apparatus for teaching prosodic features of speech according to claim 6, wherein the extractor is also connected to an output of the sensor.

* * * * *